July 18, 1967
L. REDMAYNE
3,331,471
FRICTION PAD RETENTION MEANS
Filed July 14, 1965
3 Sheets-Sheet 1
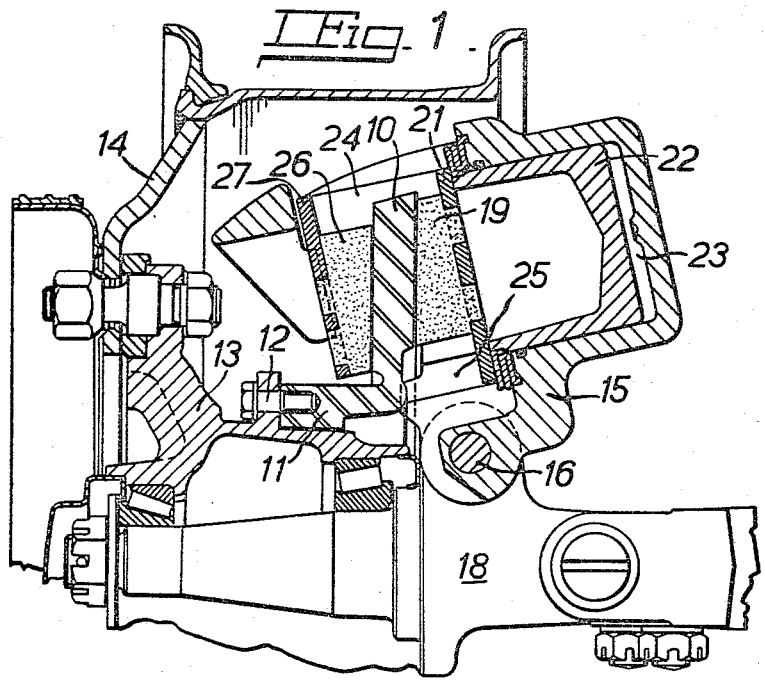
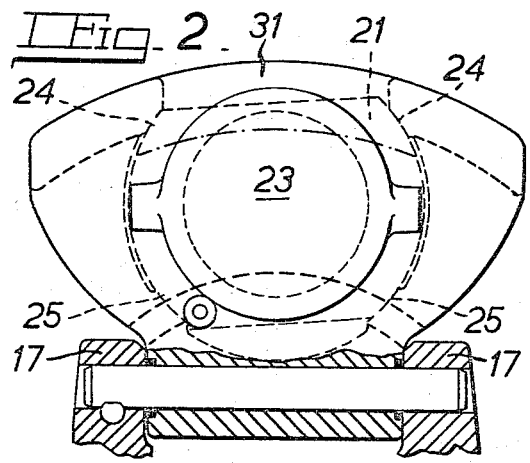

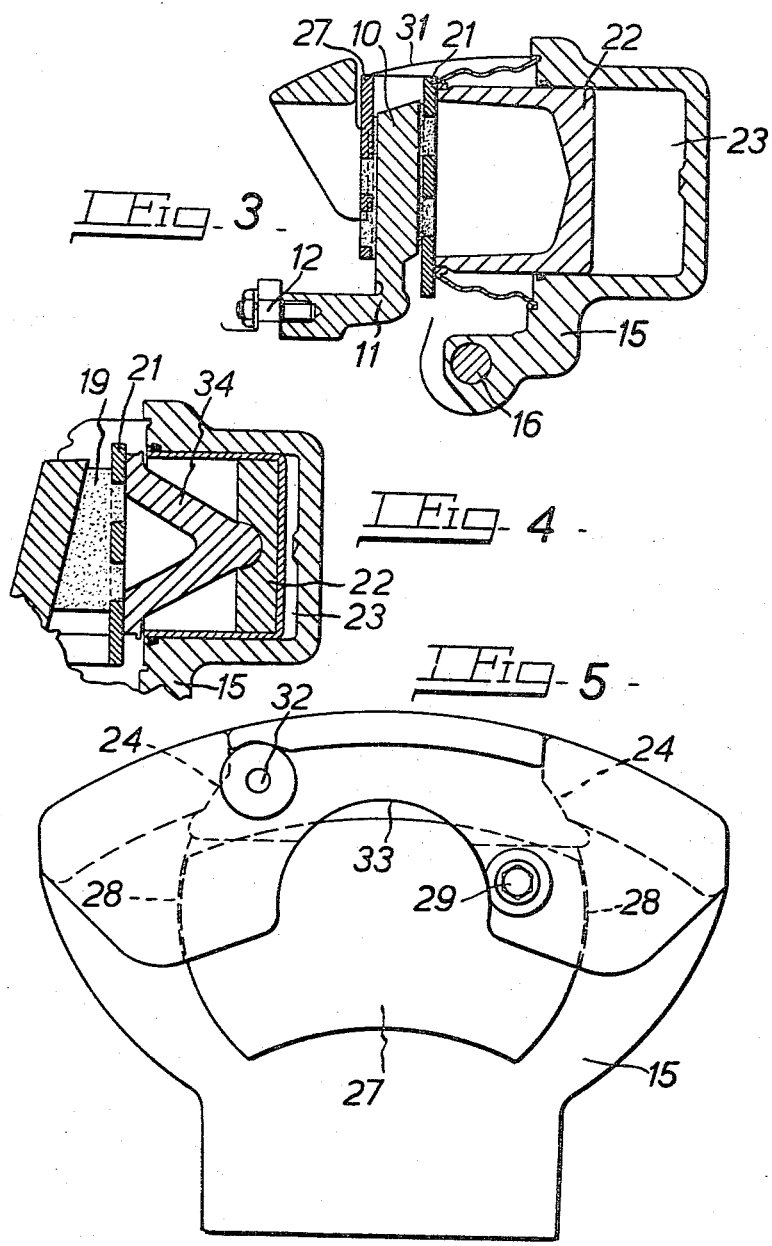

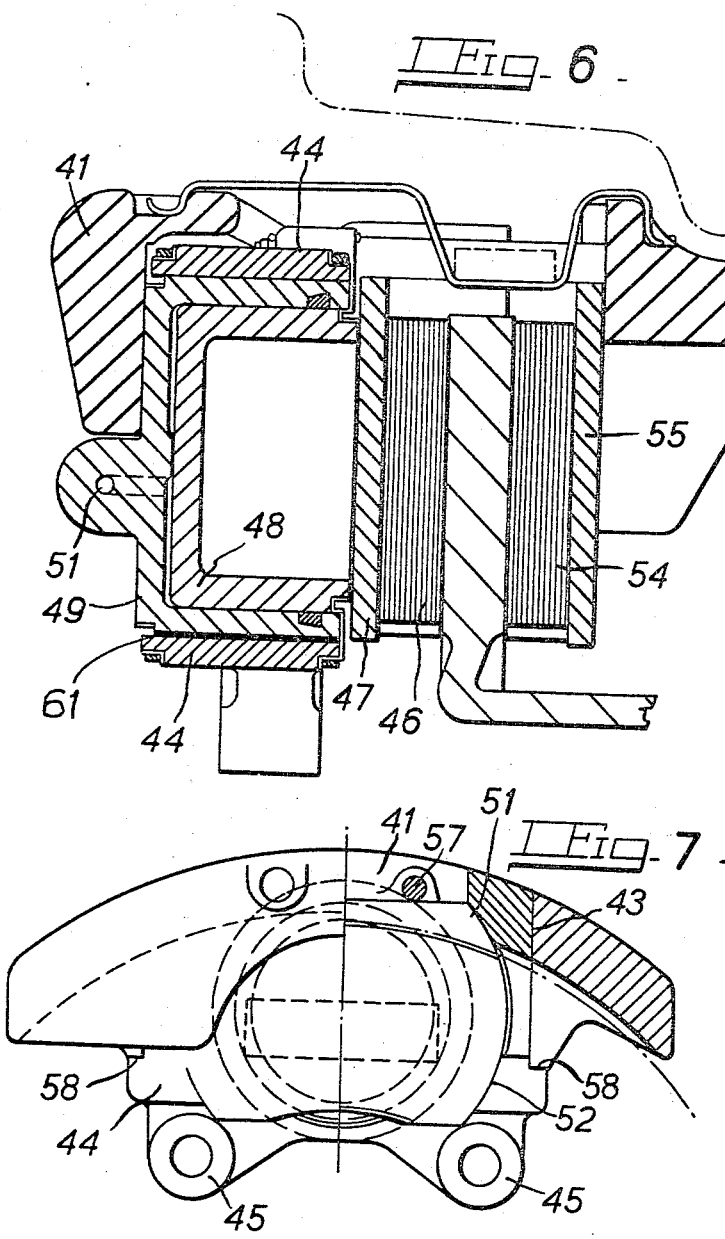

United States Patent Office 3,331,471
Patented July 18, 1967

3,331,471
FRICTION PAD RETENTION MEANS
Leonard Redmayne, Solihull, England, assignor to Girling Limited, Birmingham, England, a British company
Filed July 14, 1965, Ser. No. 471,840
Claims priority, application Great Britain, July 30, 1964, 30,447/64
5 Claims. (Cl. 188—73)

This invention relates to improvements in disc brakes of the kind in which a caliper straddles a portion of the periphery of a rotatable disc and friction pads for engagement with opposite faces of the disc are located in the caliper which incorporates actuating means for applying at least one of the friction pads directly to the disc.

If the caliper is axially movable relative to the disc or is mounted to swing about an axis substantially at right angles to the disc only one friction pad need be directly actuated, the other friction pad being applied to the disc by the reaction on the caliper.

According to our invention, in a disc brake of the kind set forth at least one friction pad means has part-circular ends co-operating with complementary part-circular drag-taking abutments on the caliper, and the caliper has an opening of a circumferential length less than the circumferential length of the friction pad means but greater than its radial dimension whereby after partial rotation of the friction pad means it can be withdrawn from the caliper.

The friction pad assembly will usually comprise a pad of friction material bonded or otherwise secured to a rigid backing plate having part-circular ends for co-operation with the abutment surfaces on the caliper. Alternatively the friction pads means may comprise a block of friction material without a backing plate, the block being formed with part-circular ends for engagement with the abutment surfaces on the caliper. These surfaces on the caliper are of sufficient length in the direction of the axis of the brake to ensure that the backing plate or friction pad remains in engagement with them throughout the wear life of the pad.

Preferably the arcuate abutment surfaces on the caliper lie at least partially outside the braking path on the disc.

In a brake having a swinging or axially movable caliper only the directly actuated friction pad need be mounted in the manner described above. The indirectly actuated friction pad may be mounted in the same way or may be detachably secured to the caliper.

If the directly actuated friction pad is applied to the disc by a single hydraulic piston working in a cylinder bore in the caliper the arcuate abutment surfaces will be parts of a common circle having its centre on the axis of the cylinder bore so that these surfaces can be machined at the same time and with the same setting as the cylinder bore.

Two forms of disc brake embodying our invention are illustrated by way of example in the accompanying drawings in which:

FIGURE 1 is a vertical section of a brake having a swinging caliper;

FIGURE 2 is an end view of the inboard end of the caliper;

FIGURE 3 is a section similar to FIGURE 1 showing the caliper alone in the position it assumes when the friction pads are fully worn;

FIGURE 4 is a section of the hydraulic cylinder and directly actuated friction pad showing an alternative form of piston;

FIGURE 5 is an end view of the caliper from the outboard side;

FIGURE 6 is a section of a brake in which the caliper is mounted to slide in a direction parallel to the axis of the disc; and FIGURE 7 is an end view of the caliper in FIGURE 6 from the outboard side.

In the brake illustrated in FIGURES 1 to 5, 10 is a brake disc formed by an annular flange projecting radially from one end of an axially extending part 11 secured at its other end by bolts 12 to a rotatable hub 13 carrying a wheel 14. A caliper which straddles a portion of the periphery of the disc is mounted to swing about a pin 16 of which the ends are fixed in spaced lugs 17 on a stationary member 18 adjacent to the inboard side of the disc. The axis of the pin 16 is substantially at right angles to the axis of the disc.

The inboard face of the disc is adapted to be engaged by a friction pad 19 bonded and keyed to a rigid backing plate 21 on which acts a piston 22 working in a cylinder bore 23 in the inboard limb of the caliper. The ends of the backing plate are part-circular and are arcs of a circle of which the centre lies on the axis of the cylinder bore 23.

When the brake is applied the drag on the friction pad is taken by the engagement of one end or other of the backing plate, according to the direction of rotation of the disc, with complementary arcuate abutment surfaces 24 and 25 on the caliper.

The surfaces 24 lie wholly outside the braking path over which the friction pad engages the surface of the disc and the surfaces 25 lie partly within and partly on the inner side of the braking path. The axial length of the abutment surfaces 24 and 25 is sufficient to allow for the full movement of the backing plate towards the disc as the friction pad wears.

As shown in FIGURE 1, when the friction pads are new the abutments 25 extend into an annular cut-away portion of the disc. This allows the abutments to be correctly provided without the necessity for any special formation of the backing plate 21.

On the outboard side of the disc there is a friction pad 26 bonded and keyed to a rigid backing plate 27 located between arcuate abutment surfaces 28 in the caliper and retained in position by a bolt 29

The two friction pads are initially of the wedge shape shown in FIGURE 1. The outboard pad 26 is offset towards the axis of the disc with respect to the inboard pad 19 and the peripheral edge of the disc is chamfered as described in the specification of our patent application No. 363,373, now Patent No. 3,273,675, to provide a maximum radial clearance between the wheel rim and the disc and friction pad assembly for the accommodation of the caliper.

As the friction pads wear the caliper swings over about its pivot in a clockwise direction as seen in FIGURE 1 until, when the pads are fully worn, the caliper has reached the position shown in FIGURE 3 in which the axis of the hydraulic cylinder is substantially at right angles to the plane of the disc.

The directly actuated friction pad assembly is inserted and removed through an opening 31 in the radially outermost side of the caliper which is of a circumferential length less than the circumferential length of the backing plate 21 but greater than its radial dimension, the pad assembly being turned through 90° for insertion and removal.

To insert new friction pad assemblies the hydraulic piston is pushed back into the cylinder and with the caliper swung over clockwise as far as possible the directly actuated pad assembly is inserted first and rotated into its correct position. The caliper is then swung over in an anti-clockwise direction as far as possible and the indirectly actuated pad assembly is inserted from one end of the caliper in a circumferential direction.

The directly actuated pad assembly is normally held against rotation by a readily removable pin 32 which may also take the drag on the assembly if there is only one arcuate abutment surface on the caliper taking the torque or drag in normal forward braking.

FIGURE 5 shows a part-circular gap or opening 33 in the outboard limb of the caliper through which a tool can pass for machining the cylinder bore, and the arcuate abutments on the caliper which can be machined at the same time and with the same setting of the caliper.

In FIGURES 1 to 3 the hydraulic piston is of the usual cup-shaped type with the annular inner end of the piston engaging directly with the backing plate 21. FIGURE 4 shows an alternative arrangement in which a thrust member 34 engaging at its inner end with the backing plate is in rocking engagement at its outer end with the piston head. This arrangement avoids the application of excessive side loads on the piston when the friction pads are approaching the fully worn condition. It will be appreciated that the piston has to have sufficient travel to accommodate the angular movement of the caliper due to the wear of both friction pads.

In the brake shown in FIGURES 6 and 7 the caliper 41 is mounted to slide in a direction parallel to the axis of the brake disc 42 between parallel guiding surfaces 43 on a stationary brake carrier 44. The brake carrier is secured to a stationary part adjacent to the inboard side of the disc by bolts passing through lugs 45 extending radially inwards from the carrier.

The directly actuated friction pad 46 which engages the inboard face of the disc is bonded to a rigid backing plate 47 on which bears an hydraulic piston 48. The piston works in a cylinder formed by a sleeve 49 which is axially slidable in a bore in the carrier 44 and of which the closed outer end bears on the inner face of the inboard limb of the caliper.

Fluid under pressure from a master cylinder or the like is supplied to the outer end of the cylinder 49 through a port 51.

The ends of the backing plate 47 are arcs of a circle having its centre on the axis of the cylinder 49 and engage with complementary drag-taking arcuate surfaces 52 and 53 on the caliper, the surfaces 51 being located outside the braking path on the disc.

The indirectly actuated friction pad 54 which is located on the outboard side of the disc is bonded to a backing plate 55 which is engaged by the outboard limb of the caliper.

When fluid under pressure is admitted to the cylinder 49 the piston 48 is moved inwardly to apply the pad 46 to the disc and the cylinder is moved outwardly in the bore in the carrier and takes the caliper with it to apply the pad 54 to the disc.

To remove the pad assemblies they are turned through 90° to clear them from the abutment surfaces and withdrawn through an opening 56 in the radially outermost side of the caliper.

The pad assemblies are normally held against rotation by removable pins 57 extending across the opening. The caliper is retained in sliding engagement with shoulders 58 on the carrier by a plate spring 59 which bears on the caliper and is engaged under the pins 57.

A plastic lining or bush 61 may be located in the bore in the carrier as shown in FIGURE 6 to provide a bearing for the sleeve 49.

I claim:

1. A disc brake comprising a rotatable disc, a caliper straddling a portion of the periphery of the disc and mounted for substantially axial movement relative to the disc, friction pad means for engagement with opposite faces of said disc, actuating means for directly applying one of said friction means to the disc, said friction pad means having part-circular ends of the same radius and having a common centre and being of a circumferential length greater than its radial dimension, part-circular drag-taking abutments in said caliper for co-operation with the part-circular ends of said one friction pad means, parts of said abutments being located on the radially outer side and parts on the radially inner side of a circle having its centre on the axis of the disc and passing through the centre of pressure of said one friction pad means, said inner and outer abutment parts including radially inner and outermost portions whose respective circumferential spacing is less than the circumferential length of said pad means so that the latter in its position of use is restrained by said abutments against radial movement with respect to said caliper, said caliper having an opening in the radially outer side thereof, said opening having a circumferential dimension less than that of said pad means but greater than the radial dimension thereof, said dimension being of a size that said pad means can be withdrawn radially through said opening only upon partial rotation of said pad means on said abutments until an end of said pad means substantially registers with said opening.

2. A disc brake as in claim 1 incorporating a single removable retaining pin located in the caliper and co-operating with said one friction pad means to hold it against rotation.

3. A disc brake as in claim 1 wherein said friction pad means comprises a pad of friction material and a rigid backing plate carrying the pad and having part-circular ends for co-operation with the part-circular drag-taking abutments on the caliper.

4. A disc brake as in claim 1 wherein said friction pad means is applied to the disc by a piston working in an hydraulic cylinder in one limb of the caliper and the part-circular drag-taking abutments on the caliper are parts of a common circle having its centre on the axis of the cylinder.

5. A disc brake comprising a rotatable disc, a stationary brake carrier adjacent to one side of the disc, a caliper straddling a portion of the periphery of the disc and mounted on the carrier for movement in a direction substantially parallel to the axis of the disc, first and second friction pad means for engagement with opposite faces of said disc, actuating means in one limb of the caliper for directly applying said first friction pad means, said actuating means comprising a cylinder bore in said carrier, a sleeve slidable in said bore and closed at its outer end which bears on the caliper to move the caliper axially to apply the second friction pad means to the disc, and a piston working in said sleeve and bearing on the first friction pad means, said first friction pad means having part-circular ends of the same radius and having a common centre and being of a circumferential length greater than its radial dimension, part-circular drag-taking abutments in said caliper for co-operation with the part-circular ends of said first friction pad means, parts of said abutments being located on the radially outer side and other parts on the radially inner side of a circle having its centre on the axis of the disc and passing through the axis of said cylinder bore, said inner and outer abutment parts including radially inner and outermost portions whose respective circumferential spacing is less than the circumferential length of said pad means so that the latter in its position of use is restrained by said abutments against radial movement with respect to said caliper, said caliper having an opening in the radially outer side thereof, said opening having a circumferential dimension less than that of said pad means but greater than the radial dimension thereof, said dimension being of a size that said pad means can be withdrawn radially through said opening only upon partial rotation of said pad means on said abutments until an end of said pad means substantially registers with said opening.

References Cited

UNITED STATES PATENTS

| | | | |
|---|---|---|---|
| 2,915,147 | 12/1959 | Davis | 188—73 |
| 3,185,263 | 5/1965 | Schanz et al. | 188—73 |
| 3,260,332 | 7/1966 | Wells | 188—73 |
| 3,285,371 | 11/1966 | Cadiou | 188—73 |

FOREIGN PATENTS

| | | |
|---|---|---|
| 227,747 | 4/1960 | Australia. |
| 1,353,793 | 1/1964 | France. |
| 828,961 | 2/1960 | Great Britain. |
| 867,785 | 5/1961 | Great Britain. |

MILTON BUCHLER, *Primary Examiner.*

G. E. HALVOSA, *Assistant Examiner.*